United States Patent [19]
Hug

[11] 3,894,782
[45] July 15, 1975

[54] ELECTRICAL CONNECTOR MOUNTED ON A SUPPORT PLATE

[75] Inventor: Alfred Jean Théodore Hug, Zurich, Switzerland

[73] Assignee: ARFINA fur Continentale und Uebersee-Finanzinteressen, Vaduz, Liechtenstein

[22] Filed: May 31, 1973

[21] Appl. No.: 365,628

[30] Foreign Application Priority Data
June 2, 1972 Switzerland.................... 8238/72

[52] U.S. Cl.................... 339/64 R; 248/27; 248/56; 285/82; 285/206; 339/130 C
[51] Int. Cl.............................. H01r 13/62
[58] Field of Search................ 339/64–66, 339/93, 129, 130; 285/82, 161, 206, 210; 248/27, 56

[56] References Cited
UNITED STATES PATENTS

| | | | |
|---|---|---|---|
| 903,768 | 11/1908 | Platt | 339/130 R |
| 1,533,690 | 4/1925 | Both | 339/130 R |
| 3,047,828 | 7/1962 | Gregson et al. | 339/64 R |
| 3,056,940 | 10/1962 | Winestock | 339/64 R |
| 3,104,120 | 9/1963 | Myers | 285/161 |
| 3,488,623 | 1/1970 | Stephenson et al. | 339/64 M |

*Primary Examiner*—Joseph H. McGlynn
*Attorney, Agent, or Firm*—Brisebois & Kruger

[57] ABSTRACT

An electrical connector which comprises a male or a female element mounted on a support plate. The element is mounted substantially perpendicular to the plate and passes through an opening in the plate. Play is provided in the plane of the plate between a portion at least of the element and the plate.

3 Claims, 5 Drawing Figures

ELECTRICAL CONNECTOR MOUNTED ON A SUPPORT PLATE

The present invention relates to an electrical connector i.e. a plug or a socket and is more particularly concerned with a connector in which a male or female element of the connector is mounted on a support, such as a plate for example, perpendicularly to the plane of the support and passes through an orifice from one side of the support to the other. The invention also relates in particular to such connectors when assembled i.e. when connected together.

To provide electrical connections between fixed pieces and detachable pieces supported by an aircraft instrument panel for example, it has until now been known to attach male or female connector elements, particularly co-axial connectors, to a support, e.g. an aircraft instrument panel plexiglass plate, perpendicularly to the plane of the plate, the end of the connector element passing through an orifice formed in the plate.

A considerable disadvantage of this technique stems from the fact that as a result, on the one hand, of machining tolerances and, on the other, of ever-possible distortions, the connector elements supported by the plate in different positions are often not situated exactly opposite corresponding connector elements attached to other parts of the aircraft, and this poses mounting problems which are sometimes insoluble.

The present invention proposes to provide an assembly of connectors on a support, such as an aircraft instrument panel plate for example, enabling this type of disadvantage to be overcome.

According to the present invention an electrical connector comprises an element mounted on a support in a direction substantially perpendicular to the plane of the said support, passing through an orifice in the said support, and play is provided in the plane of the said support, between at least a portion of the said connector element and the said support.

In this way, the connector element or at least a portion of this element can move about relative to the support, to the extent of the play thus created, permitting adaptation of the connector element to the position of the complementary connector element, even for large tolerances or distortions of the support.

In a first, pertiularly simple embodiment of the invention, the play is obtained by imparting to the orifice through which the connector element passes a diameter or dimensions sufficiently greater than the diameter or dimensions of the corresponding portion of the periphery of the connector element, the said connector element having means for immobilising it axially of the orifice, while allowing freedom of movement in accordance with the play thus created.

In a second, more advantageous embodiment, the connector element is mounted in a washer, the internal diameter or dimensions of which are greater than the diameter or dimensions of the corresponding portion of the periphery of the connector to create play between the connector and the washer, the connector having means for substantially immobilising the element perpendicularly to the washer. Moreover, the said washer is mounted in the orifice in the support, the diameter or the dimensions of which are sufficiently greater than the diameter or dimensions of the periphery of the washer to allow play between the said washer and the said support, means also being provided to keep the element substantially immobilised against the support in the direction perpendicular to the support.

In a third, particularly advantageous embodiment, an interior portion of the connector element is mounted with play in the remainder of the peripheral body of the element, so as to be able to move about in a plane substantially perpendicular to the connection direction and parallel to the general plane of the support, the said peripheral body of the connector having means for substantially immobilising the said interior portion of the connector in the connection direction. In this embodiment, the said exterior peripheral body can simply be attached to the support at the orifice in the support without any play, in a conventional manner. However, as a modification, the outer, peripheral body of the connector element can itself be mounted with play in the support, either directly or, as before, by means of a floating washer.

Where the connection element has a substantially circular outer section, which is in particular the case in the majority of co-axial connectors, means can also be provided to substantially immobilise the connector element against rotation relative to the support. These means can advantageously consist of tongues or tabs attached to the connector element and entering notches or openings in the support or vice versa.

The invention also relates to a connector which can be employed for an assembly in accordance with the third embodiment, which connector is characterized by the fact that at least one of its element has an interior portion mounted with play in the remainder of the peripheral body of this element to be able to move about in a plane substantially perpendicular to the connection direction, the said peripheral body having means co-operating with the said interior portion to immobilise it in the connection direction.

Other advantages and features of the invention will become apparent on reading the following description, which is by way of a non-limiting example, with reference to the attached drawings, in which.

Figure 1:
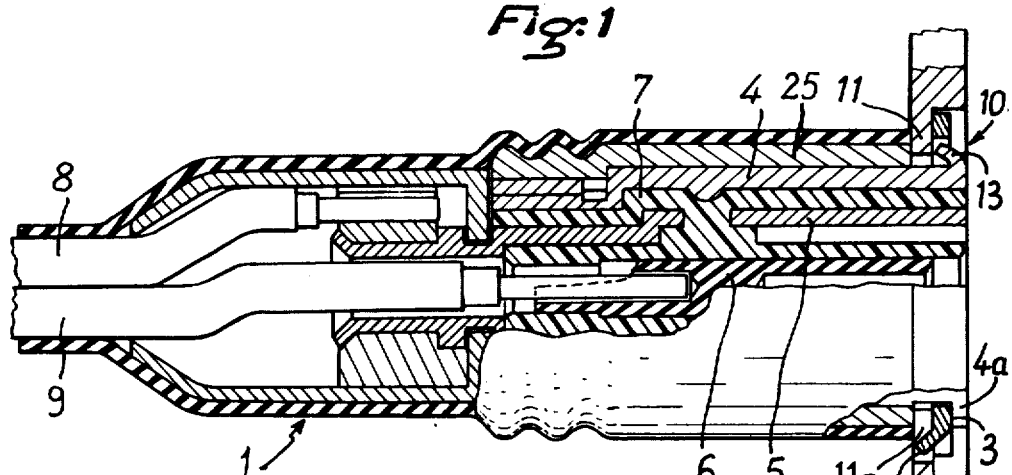
FIG. 1 shows a partial section of a connector element fixed on a support by means of a washer.
Figure 2:
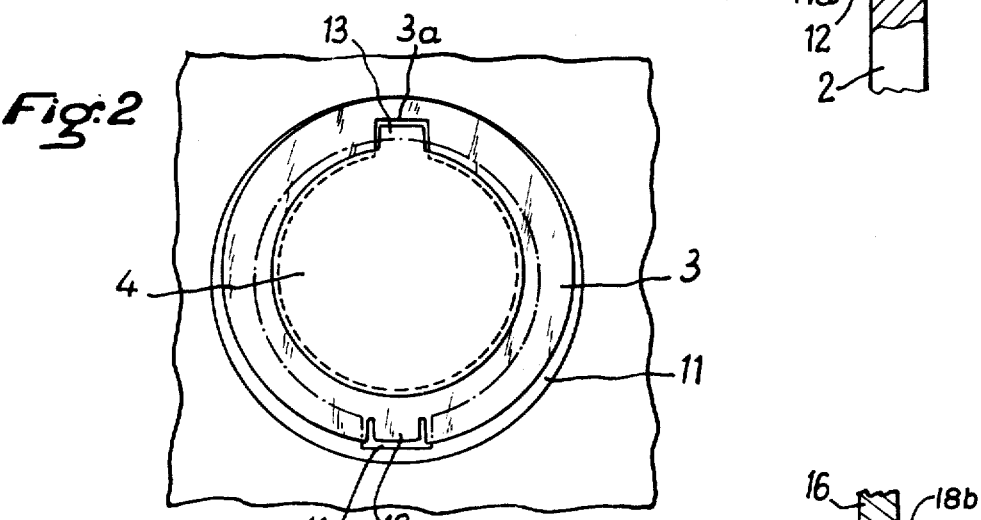
FIG. 2 shows a front view of the connector in the support.

Reference is firstly made to FIGS. 1 and 2.

Connector element 1, in this case a co-axial, female, connector element, is mounted on a sheet metal chasis plate 2 by means of a washer 3. This element 1 principally has a peripheral body 4 surrounding a peripheral conductor 5 inside which is situated central conductor 6, separated from the peripheral conductor by an insulator 7. Peripheral conductor 5 is connected to a lead 8, while internal conductor 6 is connected to a lead 9.

As also shown in FIG. 2, plate 2 is pierced by a stepped orifice 10 having an annular shoulder 11 on the side of element 1. Orifices 10 therefore has a diamter in the zone of shoulder 11 smaller than the portion of orifice 10 arranged on the side of plate 2 opposite to element 1. A radial notch 11a is formed in shoulder 11.

FIG. 2 shows orifice 10 with shoulder 11 and notch 11a. The portion of orifice 10 of smaller diameter defined by shoulder 11 is shown in a chain-dotted line.

Annular washer 3 has a tab 12, turned up out of its plane, which enters notch 11a with sufficient play. As a result, washer 3 can move about in the plane of orifice 10 while, however, being substantially immobilised with respect to rotation because tab 12 enters notch 11a, a certain play being allowed, however, in all the directions of the plane because the outer diameter of washer 3 is sufficiently smaller than the largest diameter of orifice 10 and the dimensions of tab 12 are sufficiently smaller than the dimensions of notch 11a.

Washer 3 itself has an internal notch 3a diametrically opposed to tab 12 and opening into its internal orifice shown in FIG. 2 in a broken line. This notch 3a is entered by a tab carried by the end 4a of the peripheral body portion 4 of element 1. FIG. 2 shows the peripheral outline of end 4a of portion 4 in a continuous line. As shown in the Figures, the diameter of the end of portion 4 is greater than the diameter of the internal orifice of the washer, while the diameter of the portion of body of 4 which passes through the internal orifice of the washer is sufficiently smaller than the diameter of this internal orifice for the said portion of body 4 to be able to move about inside the orifice of the washer.

In sum, body 1 can move about inside the orifice of the washer while, however, being substantially immobilised with respect to rotation in this washer, by means of tab 13, while, however, the washer can itself move about in orifice 10, while being immobilised with respect to rotation by tab 12. The total play with which connector element 1 can move about relative to plate 2 is, therefore, the sum of the play of element 1 in the washer and the play of the washer in the orifice in the plate.

Immobilisation of element 1 in the connection direction, i.e. the direction perpendicular to plate 2, is obtained on the one hand by the fact that the outer dimensions of connector element 1 are greater because of nut 25 than the smallest diameter of orifice 10, and on the other hand by the fact that end 4a has a diameter greater than the diameter of the orifice of washer 3, the outer diameter of which is itself greater than the smallest diameter of orifice 10. It must be noted that these differences in diameter can be kept sufficiently small although the total play is large, because the total play is divided into two different plays. This offers a considerable advantage by distinctly reducing the risk of jamming.

Of course, it would also be possible, as a modification, to dispense with washer 3 by giving end 4a the peripheral dimensions of washer 3, although, for the above-mentioned reasons, it is preferable to divide the play in two by means of the washer.

Figure 3:
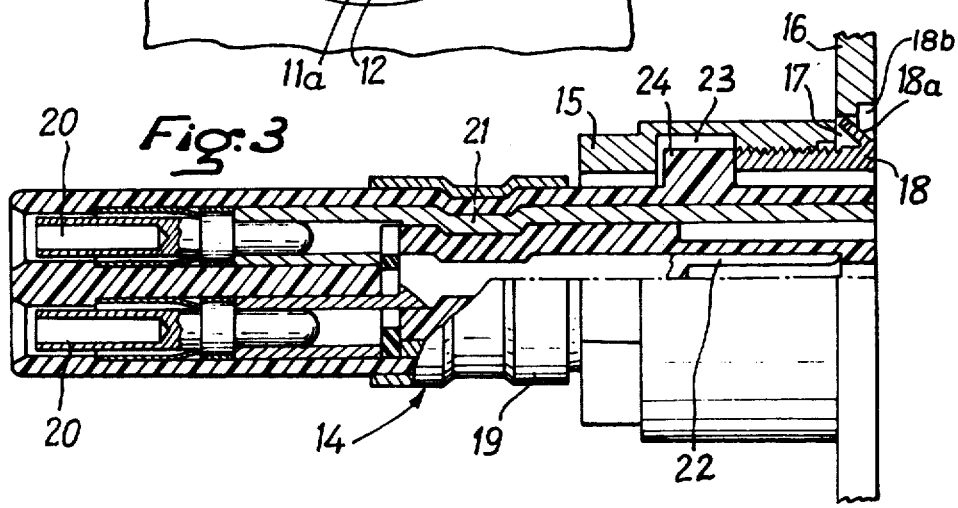
FIG. 3 shows a partial section of a connection element with an internal floating portion, fixed on a support.
Figure 4:
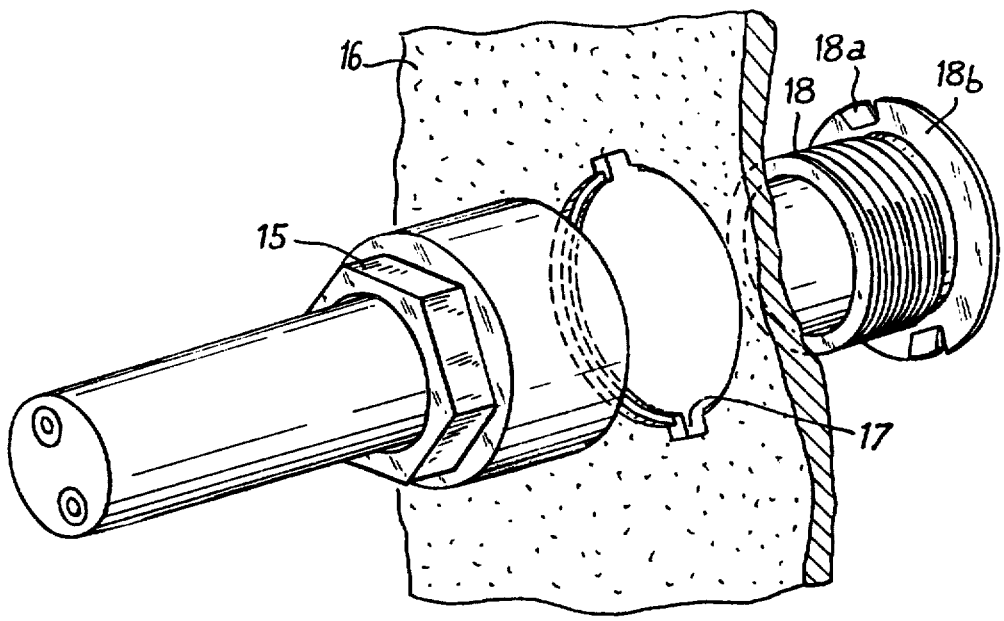
FIG. 4 is a perspective view of the connector of FIG. 3.
Figure 5:
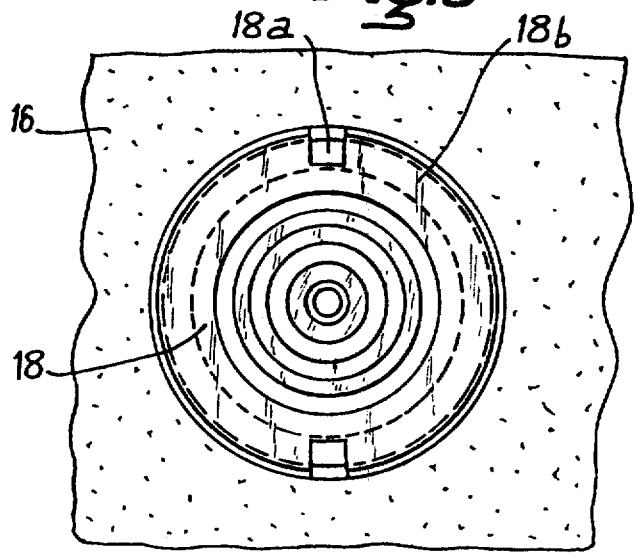
FIG. 5 is an end view of the connector of FIG. 3.

Reference will now be made to FIG. 3.

In this other embodiment, connector element 14 has a peripheral body 15 mounted fixedly on plate 16 and passing through an orifice formed in this plate, which orifice has a radial notch 17 which is entered by a tab 18a of a sleeve 18 screwed into body 15. When sleeve 18 is screwed into body 15, the edge of the orifice in plate 16 is gripped between the flange 18b at the end of sleeve 18 and body 15, which is thus fixed to the plate while, moreover, being immobilised with respect to rotation by tab 18a.

On the other hand, element 14 has an internal connector body 19 which carries the different conductors of the connector. For this purpose, this internal body 19 has sockets 20 at its rear end for the attachment of conductors connected to element 14. One of these sockets 20 is connected to peripheral conductor 21, while the other is connected to central conductor 22.

As shown in the Figure, the diameter of the portion of body 19 which passes through outer, peripheral body 15 is sufficiently smaller than the internal diameter of body 15 to allow the required play parallel to the plane of plate 16 between bodies 15 and 19. Immobilisation in the axial direction, i.e. perpendicular to the plate, is effected by means of an internal groove 23 provided in body 15, which groove is entered by a collar 24 of internal body 19. To facilitate mounting of the collar in the groove, one of the sides of groove 23 is formed by the end of nut 18.

Of course, means can be provided to substantially prevent the rotation of body 19 in body 15, for example by means of a tab entering a corresponding notch. As a modification, groove 23 could be replaced by a simple radial cavity, which would be entered by a radial projection of body 19 replacing collar 24. In this manner, both immobilisation with respect to rotation and immobilisation in the connection direction perpendicular to plate 16 are obtained. On the other hand, it will be understood that body 15, instead of being attached directly to plate 16, could be mounted on plate 16 by means of a washer such as 3, thus obtaining additional play.

Although the invention has been described with reference to a particular embodiment, it is understood that it is in no way limited to it and that various modifications could be made to it without thereby departing from its scope or spirit.

I claim:

1. An assembly comprising a supporting plate having an orifice therein and an electrical connector mounted in said orifice, said connector comprising an outer part having an end which abuts the edge of said plate encircling said orifice and an inner part containing at least one electrical conductor extending into said orifice and mounted in said outer part for limited movement therein in a direction parallel to said plate;

means preventing any substantial movement of said inner part relative to said outer part in a direction perpendicular to said plate, said means comprising a projection on one of said parts which projects into a recess carried by the other of said parts; and a threaded sleeve extending through said orifice, said sleeve having an inner end screwed into said outer part and encircling said inner part, and an outer end carrying an abutment which projects radially outward from said sleeve to overlap the edge of said plate encircling said orifice and thereby grip said edge between said abutment and said abutting end of said outer part, said sleeve and plate being provided with cooperating means for preventing rotation of said sleeve relative to said plate, said rotation-preventing means comprising at least one tab projecting from said abutment toward said plate and a recess in said plate which receives said tab.

2. Assembly as claimed in claim 1 in which said means for preventing movement of said inner part relative to said outer part in a direction perpendicular to said plate comprises a collar on said inner part and a cooperating annular groove carried by said outer part.

3. Assembly as claimed in claim 2 in which the end of said sleeve remote from its abutment defines at least part of one wall of said annular groove.

* * * * *

UNITED STATES PATENT AND TRADEMARK OFFICE
CERTIFICATE OF CORRECTION

PATENT NO. : 3,894,782
DATED : July 15, 1975
INVENTOR(S) : ALFRED JEAN THEODORE HUG It is certified that error appears in the above-identified patent and that said Letters Patent are hereby corrected as shown below:

[73] Assignee: ARFINA Anstalt fur Continentale und Uebersee-Finanzinteressen, Vaduz, Liechtenstein Signed and Sealed this Twenty-sixth Day of October 1976

[SEAL]

Attest:

RUTH C. MASON
*Attesting Officer*

C. MARSHALL DANN
*Commissioner of Patents and Trademarks*